J. Foster,
Tree Protectors,
Nº 19,357. Patented Feb. 16, 1858.
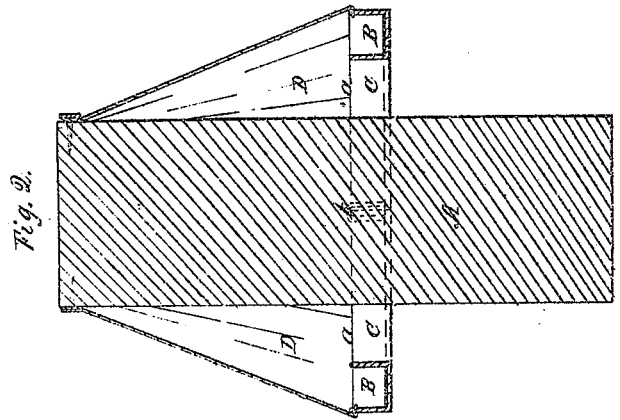
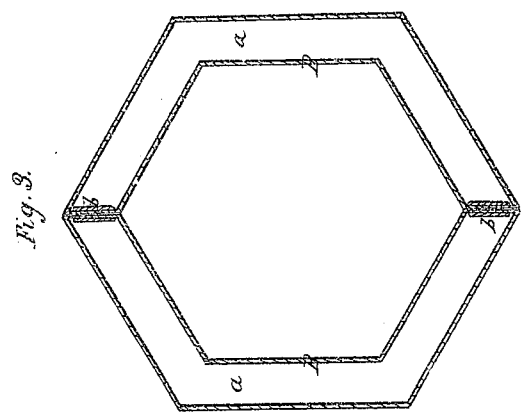
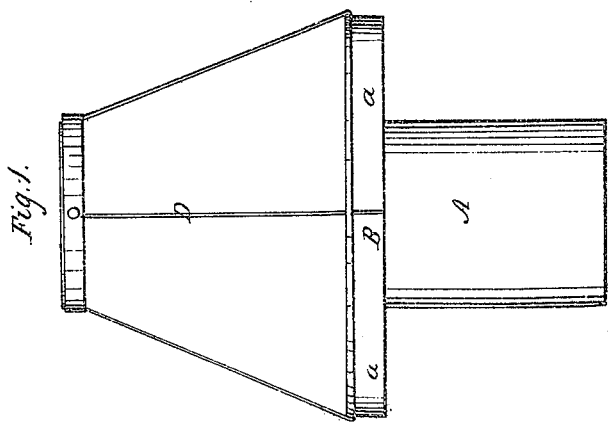

UNITED STATES PATENT OFFICE.

JOSIAH FOSTER, OF SANDWICH, MASSACHUSETTS.

IMPROVEMENT IN TREE-PROTECTORS.

Specification forming part of Letters Patent No. 19,357, dated February 16, 1858.

*To all whom it may concern:*

Be it known that I, JOSIAH FOSTER, of Sandwich, in the county of Barnstable and State of Massachusetts, have invented an Improved Tree-Protector; and I do hereby declare that the same is fully described and represented in the following specification and the accompanying drawings, of which—

Figure 1 denotes a side elevation of my invention or protector as applied to the trunk of a tree. Fig. 2 is a vertical section of the same. Fig. 3 is a horizontal section of the trough, to be hereinafter described.

In these drawings, A denotes the trunk or a short part of the trunk of a tree. Extending around such trunk is a trough, B, made of sheet metal or other suitable material, it being so disposed as not to touch the tree, but to have a clear space, C, between it and the trunk of the tree and entirely around the said trunk. A cover, D, of cotton, cloth, or other suitable elastic or elastic and flexible material, encompasses the trunk A, and is secured thereto by tacks driven through the cover near to its upper edge, the cover at such edge being made to fit so closely to the tree as to prevent any insect or canker-worm from passing through the joint. The lower edge of the cover is fastened to the outer edge of the trough, the whole being arranged as shown in Figs. 1 and 2. For convenience of emptying the trough of its contents, such trough may be constructed in two or more sections or separate troughs, $a\ a$, connected together by hinges or held together by a curved clasp, $b$, (see Fig. 4, which is a vertical section of the two abutting ends of two troughs fastened by the clasps $b$,) applied to their abutting ends, the same being to enable the troughs to be tipped sufficiently when it may be desirable to empty them of liquid and worms which may have been caught in them.

From the above it will be seen that the elastic and flexible cover serves not only as a roof to the trough and a means of suspending it from the tree, but by its elastic property it will offer no impediment to the enlargement or growth of the trunk in diameter. Its flexibility allows the sections of the trough to be tipped up or turned over to the greatest extent which may be desirable in order to empty them as described.

When a protector of the above-described kind is applied to the trunk of a tree it operates as a sure preventive to the passage of worms by it and up the tree, for in ascending the trunk they must pass through the space C and toward the joint of the cover and tree, such joint serving as a barrier to their further upward progress. Having arrived at the joint, the insects or worms, whichever they may be, must either retrace their path or descend the inner surface of the cloth cover. If the trough contains oil or a liquid, such will prevent an insect or worm from passing across the trough, or will entrap him. By means of the cover the trough will be protected from rain, snow, or dust.

One great and very important feature of my invention, or trough tree-protector, consists in the employment of an elastic or expansible cover for suspending the trough from the tree, the object of which is to permit the tree to grow in diameter without injurious constriction of its bark. Another important feature of such invention is to be found in the extensions of the trough and its cover around the tree in such manner that there may be a clear space between the tree and the cover and trough, a section of such space being shown in Fig. 2.

I do not claim surrounding the trunk of a tree by a trough to contain a liquid, and so that such liquid may present an impediment or barrier to the passage of insects or worms across the trough; but What I do claim is—

1. Arranging the trough around the tree so that there may be a clear space for the passage of insects or worms between it and the tree, and suspending the said trough from the body of the tree by means of an elastic or flexible elastic cover of cloth or other suitable materials, extending around and affixed at its upper edge or part to the trunk of the tree and at its lower edge to the trough, the whole being substantially in manner and so as to operate as and for the purpose above specified.

2. In connection with a flexible cover applied to the trunk of the tree as described, making the circumventing trough in two or more sections or separate troughs, so joined or applied together at their abutting ends as to be capable of being tipped so as to enable their contents to be discharged in manner as set forth.

In testimony whereof I have hereunto set my signature.

JOSIAH FOSTER.

Witnesses:
S. AUGUSTUS SEARS,
CHARLES B. HALL.